(12) United States Patent
Flemmer

(10) Patent No.: US 6,439,076 B1
(45) Date of Patent: Aug. 27, 2002

(54) ROBOTIC LOADER FOR MACHINERY

(76) Inventor: Rory C. Flemmer, 227A Rte. 1, Independe, WV (US) 26374

( * ) Notice: Subject to any disclaimer, the term of this patent is extended or adjusted under 35 U.S.C. 154(b) by 0 days.

(21) Appl. No.: 09/595,522

(22) Filed: Jun. 16, 2000

Related U.S. Application Data

(60) Provisional application No. 60/139,705, filed on Jun. 17, 1999.

(51) Int. Cl.[7] .................................................. B25T 9/06
(52) U.S. Cl. ........................ 74/490.03; 901/15; 901/21
(58) Field of Search ........................ 74/490.01, 490.03, 74/490.05; 901/15, 19, 22, 23, 25, 26

(56) References Cited

U.S. PATENT DOCUMENTS

| | | | | |
|---|---|---|---|---|
| 5,357,824 A | * | 10/1994 | Hashimoto | ................ 901/23 X |
| 5,577,414 A | * | 11/1996 | Ogawa et al. | ............. 901/21 X |
| 5,634,377 A | * | 6/1997 | Kimura et al. | ............. 901/48 X |
| 5,771,748 A | * | 6/1998 | Genov et al. | ............. 901/15 X |

* cited by examiner

Primary Examiner—Saul Rodriguez
(74) Attorney, Agent, or Firm—Jaeckle Fleischmann & Mugel, LLP

(57) ABSTRACT

A robotic loader for machinery includes an elongate column configured for being fixedly secured to a support structure or surface. A first motor is attached to the end of the column. The first motor drives a first gearbox. A first arm is fixedly secured to the first gearbox and extends perpendicularly relative to the column. The first arm is rotated in a horizontal plane when the first motor drives the first gearbox. A second motor is attached to the end of the first arm. The second motor drives a second gearbox. A stub arm is attached to the second gear box. The stub arm is parallel with the first arm. The stub arm is rotated in a horizontal second plane when the second motor drives the second gearbox. A third motor is attached to the stub arm and drives a third gearbox. A link arm is attached to the third gearbox and extends therefrom in a parallel manner relative to the first arm. The link arm is rotated in a vertical plane when the third motor drives the third gearbox.

10 Claims, 1 Drawing Sheet

ROBOTIC LOADER FOR MACHINERY

CROSS-REFERENCE TO RELATED APPLICATIONS

This application claims the benefit of U. S. Provisional Patent Application Serial No. 60/139,705, filed June 17, 1999.

FIELD OF THE INVENTION

The present invention relates to a robotic loader for machinery.

BACKGROUND OF THE INVENTION

In recent years there has been a large increase in the number of machines that run under computer control to perform various functions, such as manufacturing various parts or specific features on a part. These machines include lathes, machining centers (milling machines) and grinders. These machines are expensive, are often computer numerically controlled (CNC), and offer high rates of production. To raise the rates of production of the machines, there is an incentive to load and unload them automatically, thereby virtually eliminating human intervention in their cycle.

These machines are typically designed to be loaded by a human. Thus, in order for human loading to be efficient, the loading point is generally disposed at a height of between approximately 36 inches and approximately 48 inches from the floor or support surface. Further, since it is difficult and cumbersome for a human loader to be required to reach very far, the machines are designed to require a reach of only approximately 20 inches into the machine to the load point. Despite these accommodations in machine design which are intended to increase the efficiency of human loading, the process of human loading remains relatively inefficient in terms of both throughput and cost of labor.

Many machines, particularly lathes, have only a relatively small clearance above the chuck, or a small load space or opening. For this reason, the use of a SCARA robot is not practical or efficient for use as a loader. Anthropomorphic robots may be suitable for such a task, although they tend to be relatively slow and expensive. Specially designed Cartesian robots may be used, although they tend to be relatively large, bulky and expensive.

Therefore, what is needed in the art is a robot that is capable of loading and unloading a machine, and covers an envelope of 36 to 48 inches high and a reach of more than 20 inches.

SUMMARY OF THE INVENTION

The present invention provides a robotic loader for machinery.

The invention comprises, in one form thereof, an elongate column configured for being fixedly secured to a support structure or surface. A first motor is attached to the end of the column. The first motor drives a first gearbox. A first arm is fixedly secured to the first gearbox and extends perpendicularly relative to the column. The first arm is rotated in a horizontal first plane when the first motor drives the first gearbox. A second motor is attached to the end of the first arm. The second motor drives a second gearbox. A stub arm is attached to the second gear box. The stub arm is parallel with the first arm. The stub arm is rotated in a horizontal second plane when the second motor drives the second gearbox. A third motor is attached to the stub arm and drives a third gearbox. A link arm is attached to the third gearbox and extends therefrom in a parallel manner relative to the first arm. The link arm is rotated in a vertical plane when the third motor drives the third gearbox.

An advantage of the present invention is that efficient, machine loading of machinery is accomplished inexpensively.

BRIEF DESCRIPTION OF THE DRAWINGS

The above-mentioned and other features and advantages of this invention, a the manner of attaining them, will become apparent and be better understood by reference to the following description of one embodiment of the invention in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE DRAWINGS

Figure 1:
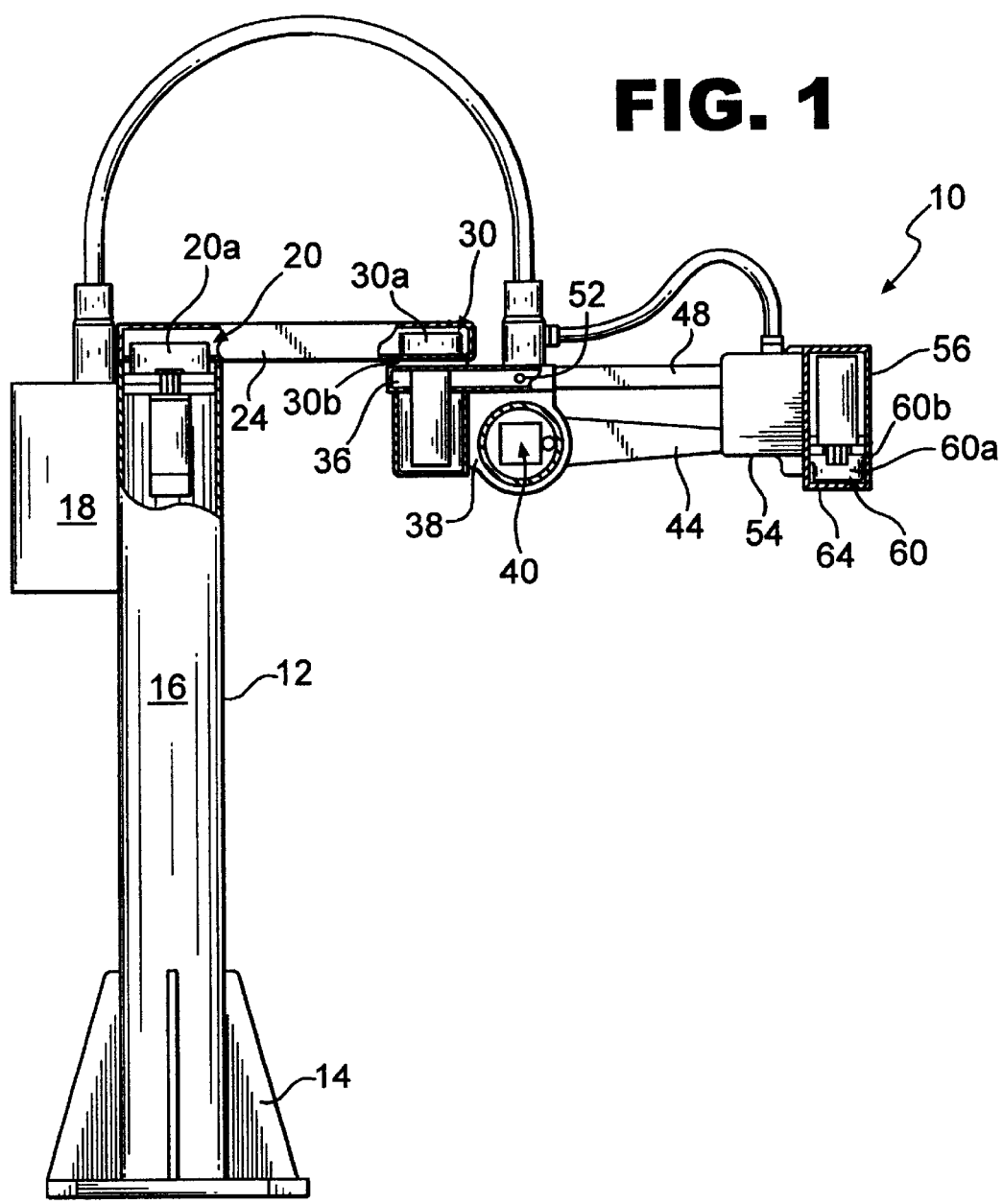
FIG. 1 is a side, partially-sectioned view, of one embodiment of the robotic loader for machinery of the present invention.
Figure 2:
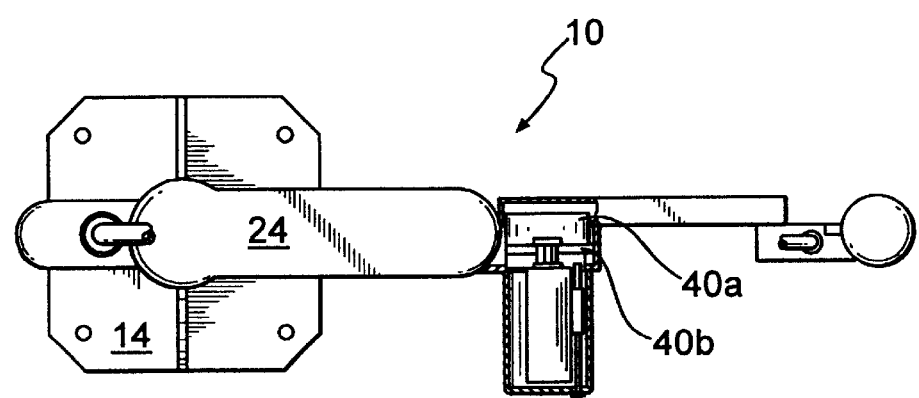
FIG. 2 is top view of FIG. 1.

Referring now to the drawings, there is shown one embodiment of a robotic loader for machinery of the present invention. Loader 10 includes elongate column 12 having base 14. Base 14 and elongate column 12 are constructed of, for example, steel. Column 12 defines axial cavity 16. Electrical box 18 is attached, such as, for example, by welding, to column 12 and is in communicating with cavity 16. A first harmonic gearbox 20 is affixed to the end of column 12 that is opposite base 14. First gearbox 20 is of conventional construction, and is coupled to a drive motor (not referenced) which drives driven hub 20a of gearbox 20. First gearbox 20 is, for example, a standard commercially available gearbox having a gear ratio of, for example, approximately 50:1 (fifty-to-one) or larger, and which includes substantially rigid bearings for the rotary motion of the driven hub to thereby enable it to function as a joint.

Upper arm 24 is an elongate arm member having a first end affixed, such as, for example, by bolting or other fastening means, to hub 20a of first gearbox 20. A second gearbox 30 having hub 30a is attached, such as, for example, by bolting or other suitable fastening means, to a second end of upper arm 24. Thus, upper arm 24 extends between and interconnects hub 20a of first gearbox 20 and hub 30a of second gearbox 30. Each of hub 20a and 30a has a respective substantially vertical axis of rotation. Thus, rotation of hub 20a results in the rotation of upper arm 24 in a substantially horizontal plane.

Stub arm 36 is an elongate arm member having two ends. At one end, stub arm 36 is affixed, such as, for example, by bolting, to flange 30b of hub 30a. Plate 38 is bolted to stub arm 36 at the end thereof which is opposite hub 30a. Third gearbox 40 includes hub 40a and flange 40b. Hub 40a is attached, such as, for example, by bolting, flange 40b to plate 38 such that hub 40a of third gearbox 40 protrudes through an orifice (not referenced) in plate 38. Lower arm 44 is attached, such as, for example, by bolting, to hub 40a of third gearbox 40. Third gearbox 40 has a substantially horizontal axis of rotation. Thus, when hub 40a of third gearbox 40 is rotated by its motor (not referenced), lower arm 44 rotates in a substantially vertical plane.

Trailing arm 48 is an elongate arm member having opposite ends. Trailing arm 48 is at one end attached, such as, for example, by use of a pin and bearing 52 or other rotatable connection means, to plate 38. Trailing arm 48 is attached to plate 38 at a point generally above where lower arm 44 is attached to hub 40a, which is also attached to plate 38 through flange 40b. Thus, trailing arm 48 is freely rotatable in substantially the same vertical plane as is lower arm 44.

Wrist plate 54 is attached to each of lower arm 44 and trailing arm 48. More particularly, wrist plate 54 is attached to the end of lower arm 44 that is opposite hub 40a and to the end of trailing arm 48 that is opposite plate 38. Wrist plate 44 is attached to lower arm 44 and trailing arm 48 in such a manner that lower arm 44 and trailing arm 48 form, and rotate vertically, in a substantially parallel manner. Housing 56 is attached to wrist plate 54.

Fourth gearbox 60, having a hub 60a and flange 60b, is disposed within housing 56. More particularly, flange 60b of fourth gearbox 60 is bolted to housing 56. A drive flange 64 is attached to hub 60a of fourth gearbox 60. Fourth gearbox 60 has a substantially vertical axis of rotation.

In use, provision is made in the configuration of machine loader 10 to use standard and commercially available electrical fittings for connection to each of the gearbox motors (not referenced). Further, each of the motors optionally incorporate a rotary encoder (not shown) to enable control of manual loader 10 to be controlled from a personal computer platform using quadrature counters and amplifiers to cause the motors driving each of gearboxes 20, 30, 40 and 60 to perform specified movements and to rotate to specified or desired positions. This control platform also issues control signals to operate, for example, air solenoids used to control standard grippers (not shown) attached to drive flange 64.

Software is provided to facilitate writing control programs for machine loader 10 which control the movement of each of gearboxes 20, 30, 40 and 60, and control of the air solenoids to thereby enable control of the loading and unloading of objects with machine loader 10. Further, the software controls the sending and receiving of electrical signals used to interface with the automatic machines with which machine loader 10 is intended for use. Optionally, the software is an editor for "G" code.

Machine loader 10 includes a low power, or standby, mode, wherein the electrical supply to machine loader 10 is reduced or limited such that speed and force of motion any arm of machine loader 10 is controlled and limited to safe limits. Further, dynamic breaking is included on the first two axes, and optionally all axes, of rotation to prevent motion of those axes upon removal of electrical power from machine loader 10.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A robotic loader for use with automatic machinery, comprising:

an elongate column having a first end and a second end, said first end configured for being fixedly secured to a support structure or surface;

a first motor attached proximate to said second end of said elongate column, said first motor driving a first gearbox;

a first elongate arm having a first end and a second end, said first end fixedly secured to said first gearbox, said first elongate arm extending in a substantially perpendicular manner relative to said column, said first elongate arm being rotated in a substantially horizontal first plane when said first motor drives said first gearbox;

a second motor attached to said second end of said first elongate arm, said second motor driving a second gearbox;

a stub arm having a first end and a second end, said first end being attached to said second gear box, said stub arm being substantially parallel with said first elongate arm, said stub arm being rotated in a substantially horizontal second plane when said second motor drives said second gearbox;

a plate attached to said second end of said stub arm;

a third motor attached to said plate, said third motor driving a third gearbox;

an elongate link arm having a first end and a second end, said first end being attached to said third gearbox, said link arm extending from said third gearbox in a substantially parallel manner relative to said first elongate arm, said link arm being rotated in a substantially vertical plane when said third motor drives said third gearbox; and an elongate trailing arm having a first end and a second end, said first end of said trailing arm being rotatably connected to said plate, said trailing arm extending in a substantially parallel manner relative to said link arm, said trailing aim configured for being rotated in a substantially vertical plane when said third motor drives said third gearbox.

2. The robotic loader of claim 1, wherein said link arm has a first length, said trailing arm has a second length, said first length being substantially equal to said second length.

3. The robotic loader of claim 1, wherein said link arm has a first length, said trailing arm has a second length, said first length being a predetermined amount different from said second length.

4. The robotic loader of claim 1, further comprising a wrist plate attached to each said second end of said link arm and said trailing arm.

5. The robotic loader of claim 4, further comprising a housing attached to said wrist plate.

6. The robotic loader of claim 5, further comprising a fourth motor disposed within said housing, said fourth motor driving a fourth gear box.

7. The robotic loader of claim 6, wherein said fourth motor has a vertical axis of rotation.

8. The robotic loader of claim 6, wherein each of said first motor, said second motor, said third motor and said fourth motor are configured for being controlled by a computer.

9. The robotic loader of claim 8, further comprising a computer, said computer including a program configured for controlling said first motor, said second motor, said third motor and said fourth motor.

10. The robotic loader of claim 1, wherein each of said first gearbox, said second gearbox and said third gearbox are harmonic gearboxes.

* * * * *